Oct. 8, 1929.  A. F. SHIRREFF  1,730,481
TRUCK
Filed Jan. 5, 1925   6 Sheets-Sheet 5
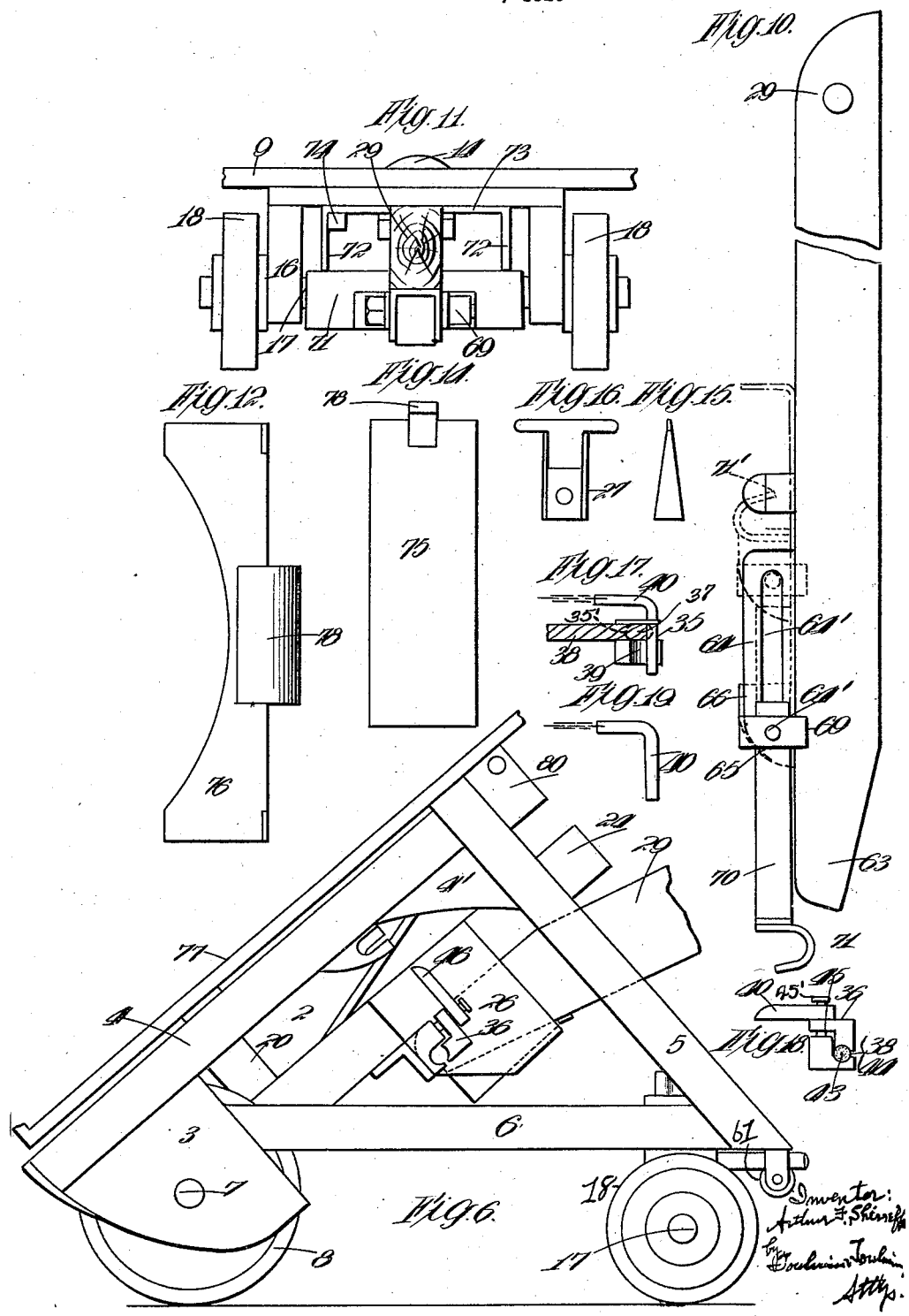

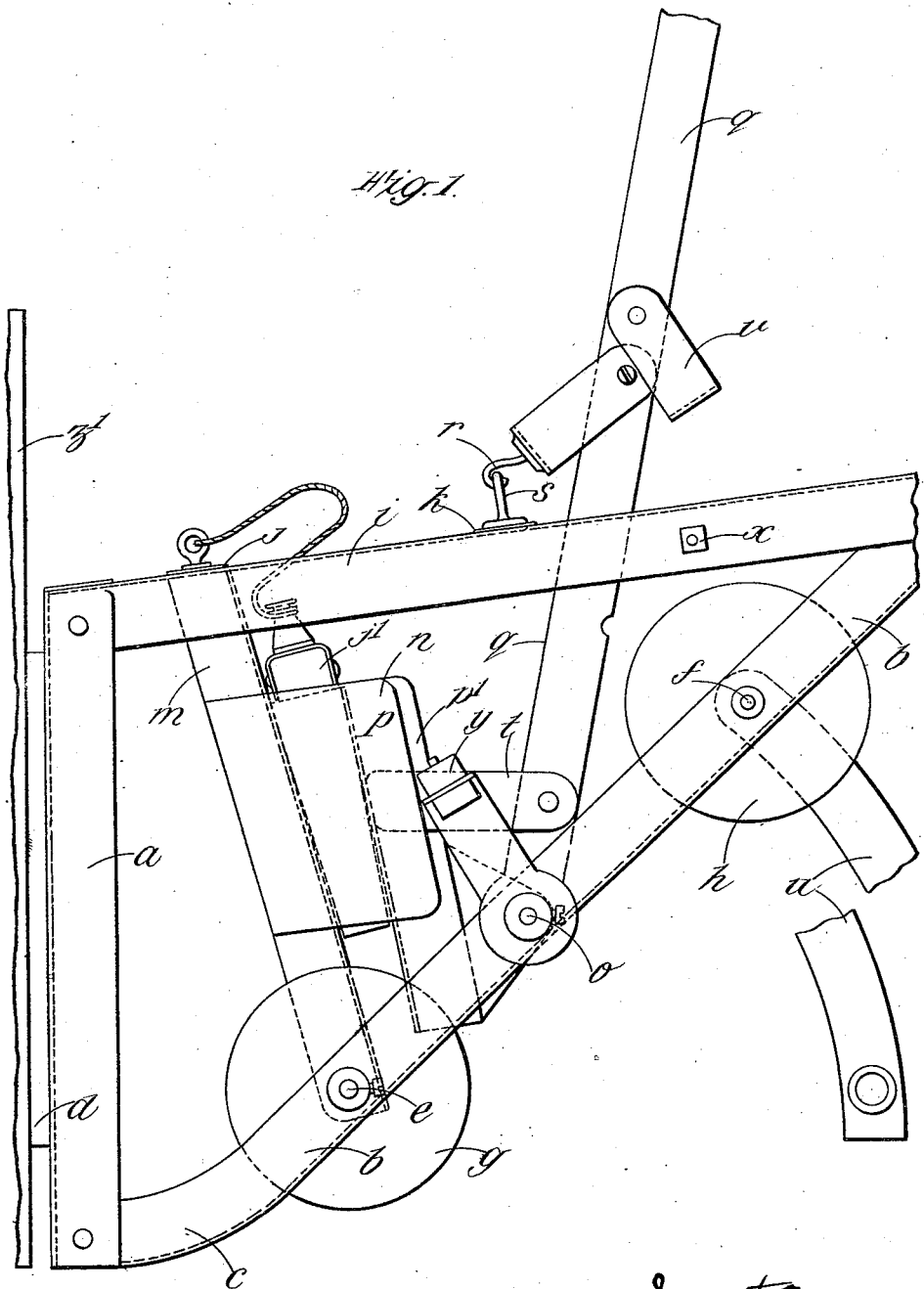

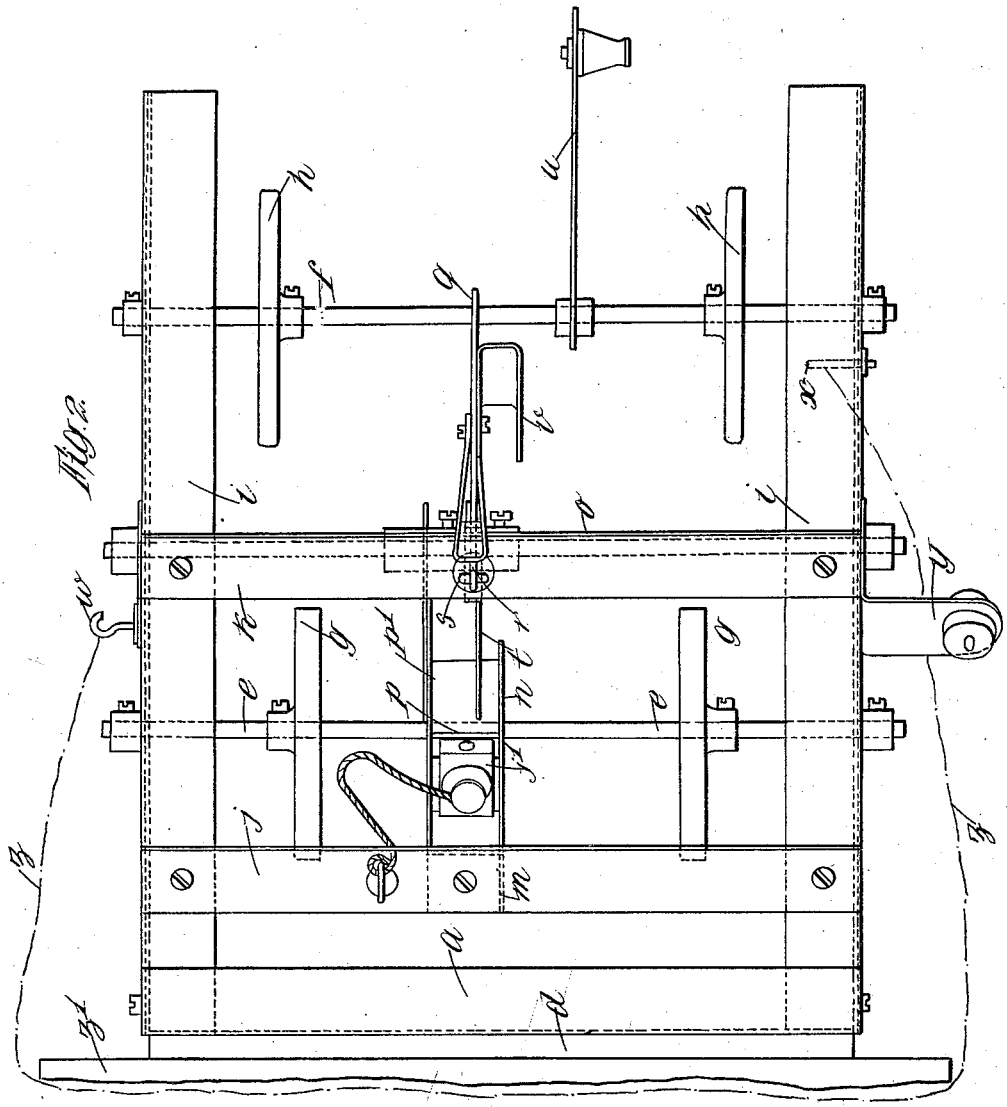

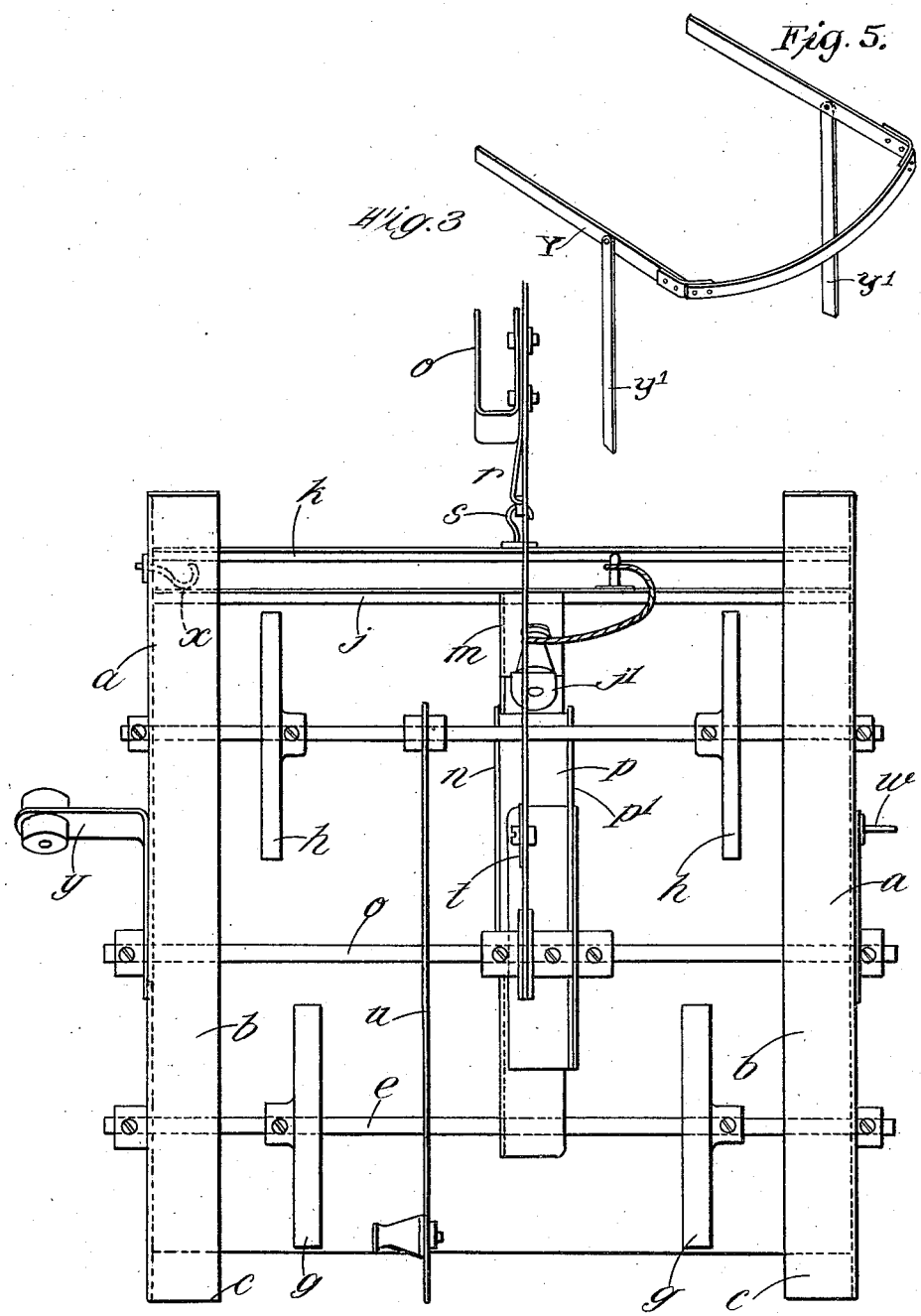

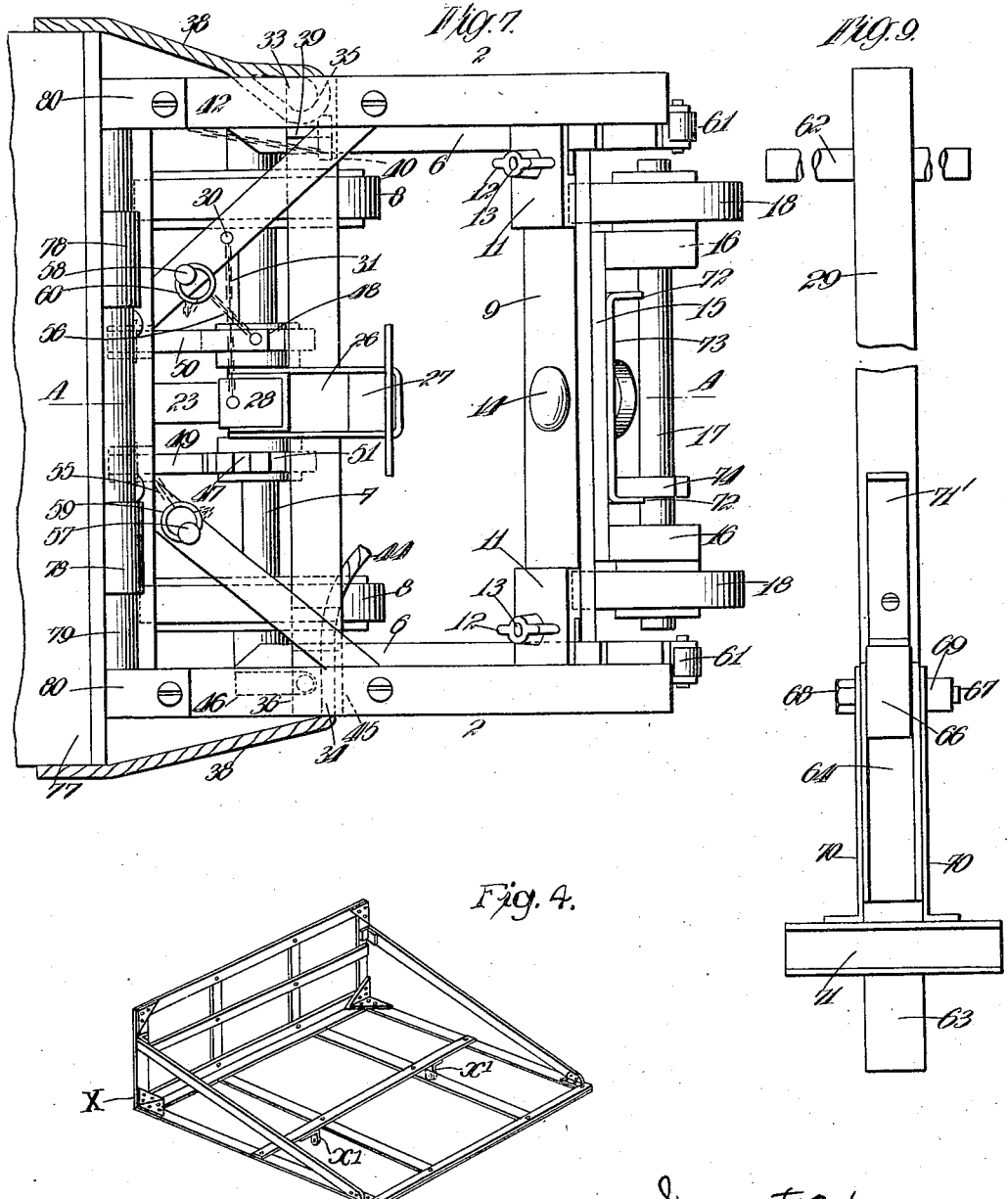

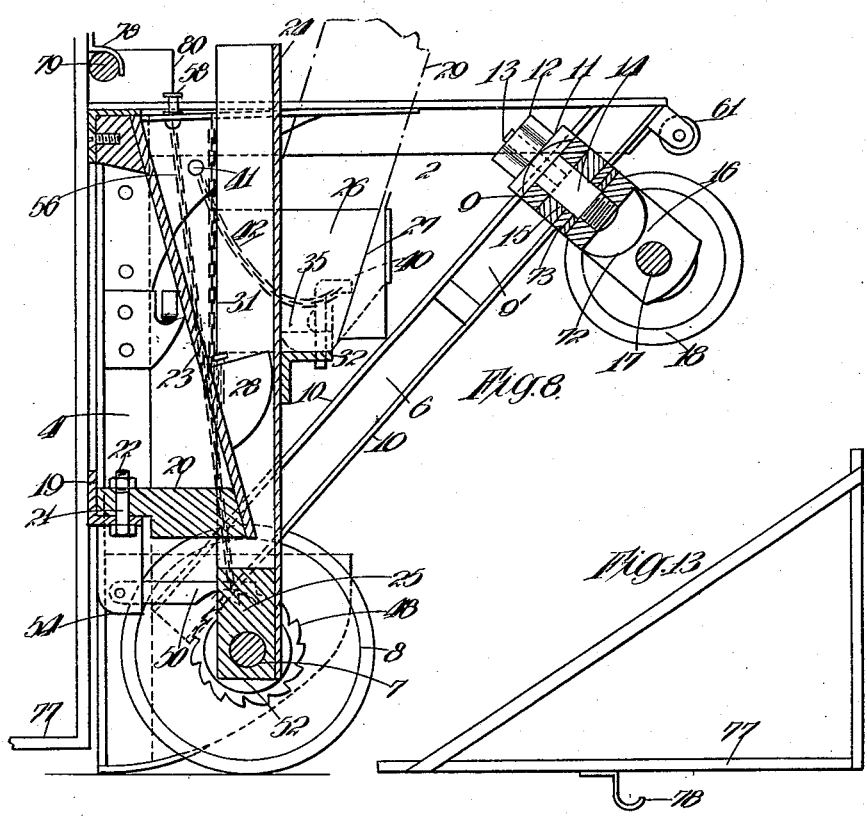

Patented Oct. 8, 1929

1,730,481

UNITED STATES PATENT OFFICE

ARTHUR FORBES SHIRREFF, OF LONDON, ENGLAND

TRUCK

Application filed January 5, 1925, Serial No. 653, and in Great Britain January 9, 1924.

This invention relates to trucks.

The object of this invention is to provide improved means for lifting heavy loads from the ground and transporting them.

A truck made in accordance with this invention is characterized by a position for loading different from the position for transport and by means for automatically securing the load on the truck by the movement of the latter from the loading to the transport position, and may further comprise means for preventing the securing member or members slackening again after tightening until desired, which may be a wedge adapted to slide between a fixed and a movable member to tighten up the securing member or members and prevent re-slackening.

Further features of my invention may be rocker members adapted to fulcrum on a pair of wheels which are provided for tipping the truck and a pair of wheels slidably mounted for altering the position of equilibrium of the load.

Referring to the drawings which illustrate one form of device made in accordance with this invention;

Fig. 1 is an elevation;

Fig. 2 is a plan;

Fig. 3 is a front view; and

Figs. 4 and 5 show perspective views of modified forms of carrier.

Referring to the drawings which illustrate a modified form of trolley made in accordance with this invention.

Fig. 6 is a side elevation of the truck tilted and loaded.

Fig. 7 is a plan thereof.

Fig. 8 is a sectional elevation along the line A—A in Fig. 7.

Fig. 9 is a part elevation of the handle detached and unextended.

Fig. 10 is a side elevation of the handle extended showing in dotted line the device folded up.

Fig. 11 is an end elevation of part of the truck showing the handle attached.

Fig. 12 is an end view of a carrier for barrels for use with the truck.

Fig. 13 is a side elevation of a carrier for small packages for use with the truck.

Fig. 14 is a plan of a carrier for ribbed or ordinary packages.

Figs. 15 to 19 show detail.

In the drawings the truck consists of a framed structure $a$ provided with lower rails $b$ bent to form curved supporting rocking members $c$ near the front corners of platform $d$. The rails $b$ have bearings for axles $e$ and $f$ of front and rear pairs of wheels $g$ and $h$ respectively, of which wheels $g$ are of appropriate dimensions to allow the trolley to rock on members $c$ when tipped. Bracing members or struts $i, i$ secure the rear corners of platform $d$ to the ends of rails $b$. Between struts $i, i$ are struts $j$ $k$ parallel to platform $d$, the former being adjacent thereto and having wedge $j'$ attached to it by a cord. Between strut $j$ and axle $e$ is medially disposed an abutment or strut $m$ provided with a guide plate $n$. Between axles $e$ and $f$ is a transverse rocking shaft $o$ carried by rails $b$ and to the middle of this rocking shaft is secured an abutment plate $p$ and guide plate $p'$ so disposed that, when the shaft $o$ is rocked, the abutment plate $p$ has an angular motion relative to the abutment or strut $m$. To the middle of shaft $o$ is secured a relatively long lifting lever or handle $q$ projecting to the rear of platform $d$. When free this handle is adapted to rest on axle $f$, but it can be secured to strut $k$ by a hook $r$ on it which engages with a hook $s$ on the strut $k$. Handle $q$ is also provided with a member $t$ for steadying plate $p$ when the latter is rocked. On axle $f$ is a curved leg $u$ adapted in one position to support platform $d$ vertical and in another to rest in catch $v$ on the handle. Side hooks $w, x$ are provided on the frame and guide $y$ on shaft $o$ to hold the chain $z$ or the like when passed round load $z'$. Rails $b$ may be medially curved to facilitate wheeling up and down stairs.

In operation the truck is tipped up until the platform $d$ is vertical. Handle $q$ is hooked to strut $k$ and leg $u$ lowered to the ground to support the truck. The load $z'$ is now chained to platform $d$ and chain $z$ hooked up as tight as possible. Handle $q$ is unhooked now and pulled back, thereby rocking shaft $o$ and separating plates $m, p$. Wedge $j'$ is dropped between plates m and p. One further pulling back handle q guide y is rocked to rearwards so that the chain z tightens on the load and the truck rocks on members c until it runs on wheels g and h and the leg u is hitched up in catch v. To unload, the truck is tipped up and the wedge j' is withdrawn, by which operation the handle q is allowed to come forward rocking guide y forward and slackening the chain z which can then be removed and the load freed. Handle q is now hooked to strut k and the leg u hitched up in its catch. The truck can now be tipped back on its four wheels and run where required.

I may provide suitable carrier members such as tray X (Fig. 4) and carrier Y (Fig. 5) secured to the truck frame by straps x' and y' for carrying special articles, and protector devices may be employed in the rope or chain to prevent damage due to pressure of the cord or the like on the article being transported.

In Figures 6 to 14 of the drawings, the truck consists of a framed structure 2 provided with curved supporting rocker members 3 near the front corners of the load supporting frame or platform 4 and inclined thereto, and with corner strengthening members 4'. Back struts or supports 5 are provided on the back of the platform 4 and between these struts 5 and the front part of said platform channelled bracing members 6 are secured. Rocker members 3 have bearings for axles 7 of the front pair of wheels 8. A cross piece 9 is adapted to slide along bracing members 6 being gripped on shoes 9' disposed between the flanges 10 thereof by members 11 with a pressure which is adjustable by means of nuts and bolts 12, 13. To a central pivot 14 on cross piece 9 a bar 15 with down turned flanges 16 is pivoted. In flanges 16 an axle 17 is disposed on which run the rear pair of trolley wheels 18, which thus have a pivotal movement with relation to the front wheels and are longitudinally adjustable in relation thereto. A cross bar 19 is disposed across the frame 4 parallel to the front thereof and to the middle of bar 19 a stop 20 is secured by bolt and nut 21, 22. A tie member 23 is disposed at the back of the frame 4 and stop 20. An abutment 24 is pivoted at 25 to axle 7. A hollow guide plate 26 is secured to abutment 24 as shown in the drawings. In the guide plate a movable partition member 27 of substantially triangular shape is disposed to form a secure socket wall. A wedge 28 is provided or adapted to slide between tie 23 and abutment 24. Guide plate 26 is adapted to receive the handle 29 when the latter is inserted in the guide plate. Hollow wedge 28 is attached to the frame at 30 by a chain 31 of suitable length. A cross-bar 32 is fixed to abutment 24 below guide plate 26 and is adapted to engage at its ends 33, 34 (shown dotted) with bracing members 6.

The ends 33, 34 are provided with rope grips 35, 36. Grip 35 is recessed at 35' to receive loop 37 on one end of the load securing wire rope 38 and is provided with a socket 39 adapted to receive a pin 40 to prevent the loop coming off the grip when in use. Pin 40 is secured at 41 to the frame by a chain 42. Grip 36 is recessed at 43 to receive the free end 44 of the rope 38, and is provided with a clinching member 45 and a tightening screw 45' to adjust the grip on the rope. To axle 7 oppositely turned ratchet wheels 47, 48 are secured, and pawls 49, 50 adapted to engage with teeth 51, 52 thereof are pivoted in bearings 53, 54 on the cross bar 19. Suitable chains 55, 56 to hold up the pawls 49, 50 when not in use are secured to the frame by members 57, 58 and are adapted to be looped thereupon by rings 59, 60. On the ends of supports 5 rollers 61 are provided. The handle 29 has an upper cross piece 62 and is chamfered off at its lower end 63. Near the lower end 63 a guide 64 with curved lower ends 65 is fixed to the handle. A supporting wedge 66 of substantially the same contour as the curved ends slides in the guide 64. A bolt 67 with nut 68 and thumb piece 69 passes through slots 64' and wedge 66 and serves as a pivot for arms 70 which carry a transverse channel member 71 at their outer ends. This channel member is adapted to fit axle 17 and be gripped thereto by the pressure of lugs 72 of the member 73 which is pivoted to bar 9 at 14. A handle 74 serves to turn member 73 and its lugs 72 into and out of gripping engagement with channel member 71. A pivoted catch 71' for the channel member 71 is provided on the handle 29.

In order to ensure the platform or support shall form a good base for its load various kinds of carriers or base members 75, 76, 77 may be provided which each have a hook 78 adapted to hook onto bar 79 which is secured to abutments at the back edge of the support.

Members 75 are suitable for use in pairs where ordinary or ribbed articles are to be loaded. Members 76 and 77 are suitable for use with barrels and small articles respectively.

In operation the members 75, 76 and 77 can be either first of all hooked onto the platform 4 or, and especially in the case of member 77, first loaded and then the truck run up and loaded with them as will hereinafter be described. Assuming that the truck is unloaded and without its handle, the thumb-piece 69 is loosened and the channel member run out in the slotted guide 64 from its closed dotted position in Fig. 10 to its extreme position shewn in full lines in the same figure. Channel member 71 is thus fitted onto the axle 17 and handle 74 pushed back so as to make lugs 72 engage member 71 and hold it on the axle. The truck is now run on its four wheels up to its load. Handle 74 is brought forward so as to disengage lugs 72 from member 71 and the handle 29 detached from axle 17. Channel member 71 is folded back and fixed by catch 71' the chamfered end 63 of the handle inserted in hollow guide plate 26 and the handle 29 used to lever the truck up, into the position shewn in Figure 1 onto its rockers 3, the wheels 8 serving as fulcrum, and propped up for the loading operation by engaging the top of catch 71 (now fixed) under cross piece 9 and engaging the end 63 of the handle with the ground. If the base member or members 75, 76, and 77 have not yet been secured to the load, the requisite one or more is or are hooked onto bar 79.

The load is now roped to the base member or members by securing the looped end 37 of the rope to grip 35, passing the free end of the rope round the load, tightening up and securing the free end to grip 36. Wedge 28 is dropped into the hollow between tie 23 and abutment 24. The handle 29 is now inserted in the hollow of the guide plate 26 and the truck pulled back onto its four wheels. This action allows wedge 28 to slip right home between tie and abutment and take up the slack of the rope and so greatly tighten the grip of the rope on the load and prevent the ropes slackening again. The handle now is again attached to the axle 17 as above described and the load drawn or pushed to its destination. In pushing there is sufficient play of the arms 70 to allow member 71 to engage cross piece 9 with the end 63 resting on it so as to give the requisite pressure. If steps have to be mounted on the way, cross piece 9 can be loosened, moved along struts 6 and secured by its nuts and bolts to draw wheels 18 nearer to wheels 8 and thus to alter the equilibrium position of the load so that it can be tipped back and the trolley come down on rollers 61. After this the front wheels can be raised over the step and the trolley after them. The wheels 18 can be readjusted to their ordinary position and the journey continued. Should gradients be met on the road to prevent accidental backward running of the truck ratchet wheels 47 or 48 can be called into play by unhooking from projection 57 or 58 the chain of the corresponding pawl 49 or 50 and allowing the said pawl to engage the ratchet teeth to stop undesired backward motion of wheels 8. A sprag (not shown) may be provided to engage a greasy road and prevent skidding in case the wheels do not grip when the ratchet device is used.

To unload the truck the loading operations above described are reversed. The truck is so designed that proportionately but small leverage of handle 29 is required.

It will be apparent that the truck may be run on wheels, rollers or other suitable runners.

What I claim and desire to secure by Letters Patent is:—

1. Truck for carrying loads, having a position for loading and a different position for transport, a member for securing the load upon the truck, a fixed member of the truck, a movable member of the truck, said movable member being moved in moving the truck into its loaded position, and a distance member adapted to be inserted between said fixed and moving members.

2. Truck for carrying loads, having a position for loading and a different position for transport, a member for securing the load upon the truck, a fixed member of the truck, a movable member of the truck, said movable member being moved in moving the truck into its loaded position, and a wedge adapted to be inserted between the said fixed and moving members.

3. Truck for carrying loads, having a position for loading and a different position for transport, a member for securing the load upon the truck, a fixed member of the truck, a movable member of the truck, means for moving said movable member with relation to said fixed member when the truck is moved into its loaded position and a distance member adapted to be inserted between said fixed and moving members.

4. Truck for carrying loads, having a position for loading and a different position for transport, a member for securing the load upon the truck, a fixed member of the truck, a movable member of the truck, said movable member being moved in moving the truck into its loaded position, and a distance member adapted to be inserted between said fixed and moving members, and means for tightening said securing member upon the load when the truck is moved to its loaded position.

5. A truck having a loading position, and a different position for transport as claimed in claim 4 having a pair of wheels and rocker members adapted to fulcrum on said wheels to facilitate said tightening motion.

6. Truck for carrying loads, having a positon for loading and a different position for transport, a member for securing the load upon the truck, a fixed member of the truck, a movable member of the truck, said movable member being moved in moving the truck into its loaded position, a wedge adapted to be inserted between the said fixed and moving members, means for tightening said securing member upon the load when the truck is moved to its loaded position, a pair of wheels and rocker members adapted to fulcrum on said wheels to facilitate said tightening motion.

7. In a truck for carrying loads, a handle therefor having a position for loading and different position for transport, a member for securing the load upon the truck, a fixed member of the truck, means for moving the said securing member with relation to said fixed member when the handle is operated to move the truck between loading and transport positions, and a member adapted to regulate the distance of the securing member from the load.

8. In a truck for carrying loads, a handle therefor having a position for loading and different position for transport, a member for securing the load upon the truck, a fixed member of the truck, means for moving the said securing member with relation to said fixed member when the handle is operated to move the truck between loading and transport positions, and a member adapted to regulate the distance of the securing member from the load, said member operating when the handle is pulled.

9. In a truck for carrying loads, a handle therefor having a position for loading and different position for transport, a member for securing the load upon the truck, a fixed member of the truck, means for moving the said securing member with relation to said fixed member when the handle is operated to move the truck between loading and transport positions, and a member rigidly connected to the handle shaft adapted to increase the grip of the securing member when the handle is pulled.

In testimony whereof, I affix my signature.

ARTHUR FORBES SHIRREFF.